US012744139B2

(12) United States Patent
Kudo et al.

(10) Patent No.: US 12,744,139 B2
(45) Date of Patent: *Sep. 22, 2026

(54) R-T-B BASED PERMANENT MAGNET

(71) Applicant: TDK CORPORATION, Tokyo (JP)

(72) Inventors: Hikaru Kudo, Tokyo (JP); Atsushi Koda, Tokyo (JP); Takahiro Suwa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 630 days.

This patent is subject to a terminal disclaimer.

(21) Appl. No.: 18/266,080

(22) PCT Filed: Nov. 10, 2021

(86) PCT No.: PCT/JP2021/041377

§ 371 (c)(1),
(2) Date: Jun. 8, 2023

(87) PCT Pub. No.: WO2022/123992

PCT Pub. Date: Jun. 16, 2022

(65) Prior Publication Data

US 2024/0047103 A1 Feb. 8, 2024

(30) Foreign Application Priority Data

Dec. 9, 2020 (JP) ................................ 2020-204546

(51) Int. Cl.
*H01F 1/057* (2006.01)
*H01F 1/053* (2006.01)
*H01F 41/02* (2006.01)

(52) U.S. Cl.
CPC ......... *H01F 1/0577* (2013.01); *H01F 1/0536* (2013.01); *H01F 41/0266* (2013.01)

(58) Field of Classification Search
CPC ............................................ H01F 1/057–0579
See application file for complete search history.

(56) References Cited

U.S. PATENT DOCUMENTS

2024/0038420 A1* 2/2024 Koda .................... H01F 1/0577
2024/0105368 A1* 3/2024 Koda ...................... C22C 38/00

FOREIGN PATENT DOCUMENTS

JP 2018-174323 A 11/2018
JP 2018174323 * 11/2018

OTHER PUBLICATIONS

Furuta. Machine Translation of JP2018174323. Published on Nov. 8, 2018. Machine translation accessed via google patents on Dec. 29, 2025. (Year: 2018).*

* cited by examiner

*Primary Examiner* — Matthew E. Hoban
(74) *Attorney, Agent, or Firm* — Oliff PLC

(57) ABSTRACT

An R-T-B-based permanent magnet including: R (rare earth element); T (Fe and Co); B (boron); and one or more selected from Al, Cu, Ga, and Zr. R includes Ce. The total R content is 31.3-34.0 mass % (inclusive), the Co content is 1.85-3.00 mass % (inclusive), the B content is 0.80-0.90 mass % (inclusive), the Al content is 0.03-0.90 mass % (inclusive), the Cu content is 0-0.25 mass % (inclusive), the Ga content is 0-0.10 mass % (inclusive), the Zr content is 0-0.60 mass % (inclusive), and the Fe content is substantially the remainder. The Ce content relative to R is 15-25 mass % (inclusive).

16 Claims, 2 Drawing Sheets

R-T-B BASED PERMANENT MAGNET

TECHNICAL FIELD

The present disclosure relates to an R-T-B based permanent magnet.

BACKGROUND

Patent Document 1 discloses an R-T-B based permanent magnet including Ce as R, and also discloses that the R-T-B based permanent magnet includes R-T phases within a predetermined range. Due to such characteristics, the R-T-B based permanent magnet with improved bending strength can be obtained.

[Patent Document 1] JP Patent Application Laid Open No. 2018-174323

SUMMARY

In general, among rare earth elements, the cost of Ce is low. Hence, it is demanded to produce a rare earth magnet having sufficient magnetic properties by using Ce.

The object of the present disclosure is to provide a low cost rare earth magnet which includes Ce, and to provide the rare earth magnet with high residual magnetic flux density (Br), coercivity (HcJ), and squareness ratio (Hk/HcJ), and also with a high corrosion resistance.

In order to achieve the above-object, the R-T-B based permanent magnet according to the present disclosure includes R (rare earth element), T (Fe and Co), B (boron), and one or more selected from the group consisting of Al, Cu, Ga, and Zr; wherein R at least includes Ce, a total amount of R is within a range of 31.3 mass % or more and 34.0 mass % or less, an amount of Co is within a range of 1.85 mass % or more and 3.00 mass % or less, an amount of B is within a range of 0.80 mass % or more and 0.90 mass % or less, an amount of Al is within a range of 0.03 mass % or more and 0.90 mass % or less, an amount of Cu is within a range of 0 mass % or more and 0.25 mass % or less, an amount of Ga is within a range of 0 mass % or more and 0.10 mass % or less, an amount of Zr is within a range of 0 mass % or more and 0.60 mass % or less, an amount of Fe is a substantial balance, and an amount of Ce to R is within a range of 15 mass % or more and 25 mass % or less.

The R-T-B based permanent magnet may include a main phase grain including an $R_2T_{14}B$ compound and a grain boundary, wherein the grain boundary may include an R-T phase.

The amount of Ce to R of the R-T phase may be larger than the main phase grain.

A total amount of heavy rare earth elements may be within a range of 0 mass % or more and 0.10 mass % or less.

The amount of Co may be within a range of 1.85 mass % or more and 2.09 mass % or less.

Figure 1:
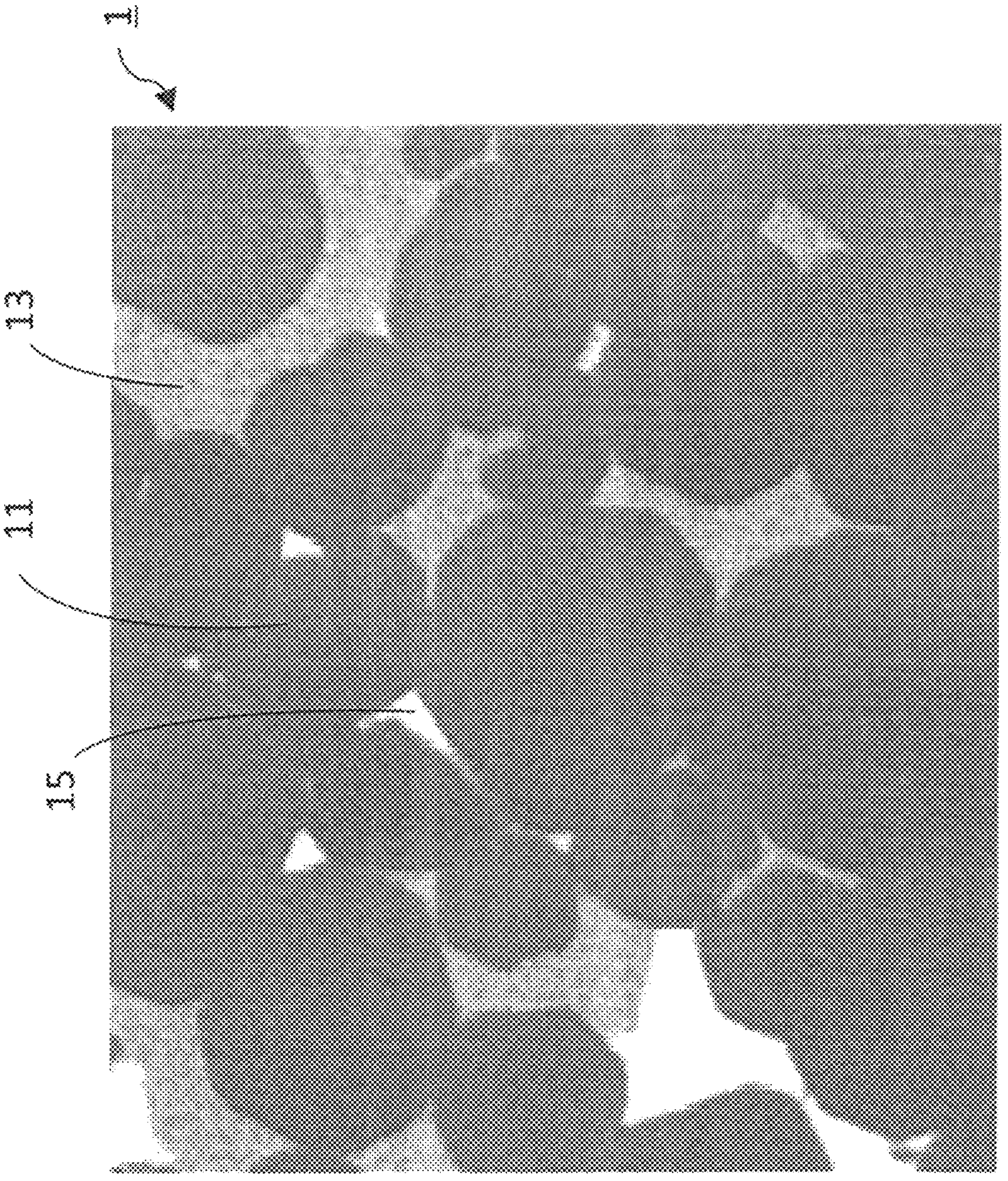
FIG. 1 is a SEM image of Example 1.

In below, the present disclosure is described based on an embodiment. An R-T-B based permanent magnet of the present disclosure may be an R-T-B based sintered magnet.

(Composition)

A composition of the R-T-B based sintered magnet is described. R includes a rare earth element. R at least includes cerium (Ce). Since R includes Ce, a raw material cost is lowered. Also, in order to suitably control the raw material cost of the R-T-B based sintered magnet and magnetic properties of the R-T-B based sintered magnet, R may include one or more selected from neodymium (Nd) and praseodymium (Pr).

T is a con bination of Fe and Co. B is boron.

Further, the R-T-B based sintered magnet includes one or more selected from the group consisting of aluminum (Al), copper (Cu), gallium (Ga), and zirconium (Zr). Furthermore, the R-T-B based sintered magnet may include two or more selected from the above-group.

In below, an amount of each element in the R-T-B based sintered magnet is described. Note that, the amount of each element shown in below indicates an amount with respect to 100 mass % of the R-T-B based sintered magnet as a whole, unless mentioned otherwise.

A total amount of R is within a range of 31.3 mass % or more and 34.0 mass % or less. It may be within a range of 32.0 mass % or more and 34.0 mass % or less to 100 mass % of the R-T-B based sintered magnet as a whole. When the total amount of R is too small, HcJ tends to decrease. When the total amount of R is too large, Br tends to decrease.

An amount of B is within a range of 0.80 mass % or more and 0.90 mass % or less. It may also be within a range of 0.80 mass % or more and 0.89 mass 5 or less, or within a range of 0.80 mass % or snore and 0.86 mass % or less. When the amount of B is too small, Hk/HcJ tends to decrease. When the amount of B is too large, HcJ tends to decrease. The reason of decrease in Hk/HcJ when the amount of B is too smaller is because a formation of a 2-17 phase which is a different phase causes Hk to decrease.

An amount of Co is within a range of 1.85 mass % or more and 3.00 mass % or less. It may also be within a range of 1.85 mass % or more and 2.80 mass % or less, or within a range of 1.85 mass % or more and 2.40 mass % or less. Also, the amount of Co may be 1.91 mass % or more, or 2.00 mass % or more. Further, the amount of Co may be within a range of 1.85 mass % or more and 2.09 mass % or less, within a range of 1.91 mass % or more and 2.09 mass % or less, or within a range of 1.91 mass % or more and 2.00 mass % or less. When the amount of Co is too small, the corrosion resistance tends to decrease. When the amount of Co is too large, HcJ tends to decrease.

An amount of Ga is within a range of 0 mass % or more and 0.10 mass % or less. That is, Ga may not be included. The smaller the amount of Ga is, the easier it is for the magnetic properties and the production stability to improve. When the amount of Ga is too large, the magnetic properties, particularly of HcJ, tend to decrease.

The amount of Al is within a range of 0.03 mass % or more and 0.90 mass % or less. It may also be within a range of 0.30 mass % or more and 0.90 mass % or less. When the amount of Al is too small, HcJ tends to decrease. When the amount of Al is too large, Br tends to decrease.

An amount of Cu is within a range of 0 mass % or more and 0.25 mass % or less. That is, Cu may not be included. The amount of Cu may be within a range of 0 mass % or more and 0.10 mass % or less. When the amount of Cu is too large, HcJ tends to decrease.

An amount of Zr is within a range of 0 mass % or more and 0.60 mass % or less. That is, Zr may not be included. It may also be within a range of 0.40 mass % or more and 0.60 mass % or less. The smaller the amount of Zr is, the easier it is for abnormal grain growth to occur. Further, because of the abnormal grain growth, Hk/HcJ tends to decrease. When the amount of Zr is too large, a 2-17 phase which is a different phase is formed in the grain boundary, and Hk/HcJ tends to decrease.

An amount of Ce to the total amount of R (TRE) is within a range of 15 mass or more and 25 mass % or less. It may be within a range of 16 mass % or more and 24 mass % or less. When Ce/TRE is too small, a raw material cost cannot be lowered. This is because the disadvantage of a complicated production step caused by using plurality of types of raw material metals including the rare earth elements outweighs the advantage of using Ce which is the lower cost compared to using other rare earth elements. When Ce/TRE is too large, HcJ tends to decrease.

A total amount of heavy rare earth elements included as R may be within a range of 0 mass % or more and 0.10 mass % or less. The larger the amount of heavy rare earth elements is, the easier it is for HcJ to increase but the cost will increase. Also, the larger the amount of heavy rare earth elements is, Br tends to decrease easier. Further, the heavy rare earth elements easily enter into the R-T phase 13 than into a main phase 11. As a result, the R-T-B based sintered magnet will form a microstructure which makes difficult to attain suitable magnetic properties. The heavy rare earth elements include, Gd, Tb, Dy, Ho, Er, Tm, Yb, and Lu.

Substantially neither yttrium (Y) nor lanthanum (La) may be included. Here, "substantially neither yttrium (Y) nor lanthanum (La) may be included" means that an amount of Y to R and an amount of La to R are 0.5 mass % or less in total. In the case that Y and La are substantially included, the below described R-T phase is unlikely to form, and it becomes difficult to attain HcJ improvement effect derived from the R-T phase. Further, in the case of including Y, anisotropic magnetic field of the main phase grains tend to decrease easily. In the case of including La, anisotropic magnetic field of the main phase grains tends to decrease easily.

An amount of Fe is a substantial balance in constituents of the R-T-B based sintered magnet. Here, "the amount of Fe is a substantial balance" means that elements other than the group consisting of R, B, Co, Ga, Al, Cu, and Zr are solely Fe and inevitable impurities. Further, an amount of inevitable impurities may be 0.5 mass % or less (including 0) in total with respect to the R-T-B based sintered magnet.

Also, in the case of including Cu, an amount of Cu may be around 0.05 mass %, more specifically, it may be within a range of 0.02 mass % or more and 0.08 mass % or less. When the amounts of other elements are within the above-mentioned range and when the amount of Cu is around 0.05 mass %, wettability of the R-rich phase during heat treatment is enhanced. As a result, a coating ratio of main phase grain by the R-rich phase is increased, and separation of magnetism between the main phase grains are facilitated, thus HcJ improves. However, when the amount of Cu is too small or too large, the wettability decreases, and HcJ decreases.

(Microstructure)

In below, an R-T-B based sintered magnet 1 is described using FIG. 1. Note that, FIG. 1 is a backscattered electron image obtained by observing a cross section of Example 1 described in below by using a field emission scanning electron microscope (FE-SEM). The backscattered electron image obtained by observation using an FE-SEM may be simply referred to as a SEM image in some cases.

When one cross section of the R-T-B based sintered magnet 1 is observed using SEM, as shown in FIG. 1, the main phase grain 11 and a plurality of types of grain boundary phases which are existing in the grain boundary can be observed. Further, the plurality of types of grain boundary phases has different color shades depending on the compositions, and different shapes depending on crystalline types.

For example, using an Energy Dispersive X-ray Spectroscopy (EDS), an Energy Probe Microanalyzer (EPMA), a Transmission Electron Microscope (TEM), or so on which are attached with FE-SEM, point analysis of each grain boundary phase is carried out to identify the composition, thereby the grain boundary phase can be specified.

Further, a crystal structure of each grain boundary phase may be determined using a Transmission Electron Microscope (TEM). By determining the crystalline structure of each grain boundary phase using TEM, the grain boundary phase can be identified further specifically.

As shown in the SEM image of FIG. 1, the R-T-B based sintered magnet 1 includes the main phase grains 11 and the grain boundary formed between the main phase grains 11. The main phase grains 11 is made of an $R_2T_{14}B$ compound. The $R_2T_{14}B$ compound is a compound having a tetragonal crystalline structure of $R_2T_{14}B$ type. The main phase grain 11 appears in black color in the SEM image. A size of the main phase grain 11 is not particularly limited, and a circle equivalent diameter may be within a range of about 1.0 μm to 10.0 μm.

The grain boundary includes a grain boundary multiple junction and a two grain boundary. The grain boundary multiple junction is a grain boundary surrounded by three or more main phase grains, and the two grain boundary is a grain boundary that exists between adjacent two main phase grains.

The grain boundary includes at least two types of grain boundary phases. In FIG. 1, the grain boundary includes an R-T phase 13 and an R-rich phase 15. Note that, when brightness of the main phase grain 11, brightness of the R-T phase 13, and brightness of the R-rich phase 15 are compared in a SEM image, the main phase grain 11 appears the darkest, and the R-rich phase 15 appears the brightest.

In the R-T phase 13, a proportion of R to T in terms of atomic ratio is about 1:2. Specifically, an amount of R of R-T phase 13 may be within a range of 20.0 at % or more and 40.0 at % or less; and an amount of T may be within a range of 55.0 at % or more and 80.0 at % or less. The amount of R may be within a range of 24.0 at % or more and 32.0 at % or less, and the amount of T may be within a range of 61.0 at % or more and 75.0 at % or less. Further, an amount of elements other than R and T included in the R-T phase 13 is 10.0 at % or less. The amount of elements other than R and T included in the R-T phase 13 may be within a range of 0.5 at % or more and 8.0 at % or less. Note that, an amount of R, T, and elements other than R and T is an amount which does not consider oxygen (O), carbon (C), and nitrogen (N).

The R-rich phase 15 refers to a phase having 40.0 at % or more of the amount of R and having smaller amount of T than the R-T phase 13. The amount of R may be 47.0 at % or more. The upper limit of the amount of R is not particularly limited, the amount of R may be 68.0 at % or less. The amount of T may be 55.0 at % or less, or 50.0 at % or less. The lower limit of the amount of T is not particularly limited, and it may be 31.0 at % or more. Note that, the amounts of R and T are amounts which do not consider O, C, and N.

Regarding the R-T-B based sintered magnet using Ce as a rare earth element which costs less but lowers HcJ compared to Nd and Pr, when the magnet composition satisfies the above-mentioned ranges, the present inventors have found that a magnet having high Br, Ha, and corrosion resistance can be obtained.

The R-rich phase 15 facilitates separation of magnetism between the main phase grains 11, and also separation of magnetism between the main phase grain 11 and the R-T phase 13. As a result, by including the R-rich phase 15, HcJ can be improved. Further, when the magnet composition satisfies the above-mentioned ranges, wettability between the main phase grain 11 and the R-rich phase 15 during heat treatment is enhanced, a coating ratio of the main phase grain by the R-rich phase is increased.

When the magnet composition satisfies the above-mentioned ranges, the R-T phase 13 tends to have larger amount of Ce with respect to the total amount of R compared to the amount of Ce in the main phase grain 11. This is because when R-T phase 13 is formed, Ce is released from the main phase grain 11. As a result, R other than Ce in the main phase grain 11 increases, specifically the amount of Nd in the main phase grain 11 increases. Thus, anisotropic magnetic field in the main phase grain 11 increases. Further, the R-T phase 13 itself as a thick soft magnetic grain boundary contributes to separation of magnetism.

When the magnetic composition satisfies the above-mentioned ranges, both of an effect of facilitating the separation of magnetism and an effect of releasing Ce from the main phase 11 are exhibited. As a result, the R-T-B based sintered magnet having a high HcJ can be obtained.

An area ratio of the R-T phase 13 to the grain boundary is not particularly limited. For example, it may be within a range of 0.60 or larger and 0.85 or smaller.

The area ratio of the R-rich phase 15 to the grain boundary is not particularly limited, and part other than the R-T phase 13 in the grain boundary may be the R-rich phase 15. Specifically, an area ratio of phase other than the R-rich phase 15 and an R-T phase 13 with respect to the grain boundary may be 10.0% or less (includes 0%).

An area of the observation field of the SEM image for calculating the above-mentioned area ratio is not particularly limited as long as it is a sufficient area for calculating the above-mentioned area ratio. For example, an area of the observation field may be 0.01 $mm^2$ or larger.

(Production Method)

In below, an example of a method of producing the R-T-B based sintered magnet is described. The method of producing the R-T-B based sintered magnet includes below described steps.

(a) An alloy preparation step for producing an R-T-B based sintered magnet alloy (raw material alloy).
(b) A pulverization step for pulverizing the raw material alloy and to obtain an alloy powder.
(c) A pressing step for pressing the obtained alloy powder and to obtain a green compact.
(d) A sintering step for sintering the obtained green compact to obtain an R-T-B based sintered magnet.
(e) An aging treatment step for aging the R-T-B based sintered magnet.
(f) A machining step for machining the R-T-B based sintered magnet.
(g) A grain boundary diffusion step for diffusing a heavy rare earth element in the grain boundary of the R-T-B based sintered magnet.
(h) A surface treatment step for surface treating the R-T-B based sintered magnet.

[Alloy Preparation Step]

An R-T-B based sintered magnet alloy is prepared (alloy preparation step). In below, a strip casting method is explained as an example of the alloy preparation step, however, the alloy preparation step is not limited to a strip casting method.

Raw material metals matching the composition of the R-T-B based sintered magnet are prepared, and the raw material metals prepared under vacuumed atmosphere or inert gas atmosphere such as argon (Ar) gas are melted. Then, by casting the melted raw material metals, a raw material alloy which is a raw material of the R-T-B based sintered magnet is produced. Note that, in below description, a one-alloy method is explained, however, a two-alloy method which obtains the raw material powder by mixing two alloys of a first alloy and a second alloy may be used.

Types of the raw material metals are not particularly limited. For example, rare earth metals, pure iron, pure cobalt, compounds such as ferroboron (FeB), alloys such as rare earth element alloy, and so on may be used. A casting method for casting the raw material metals is not particularly limited. For example, an ingot casting method, a strip casting method, a book mold casting method, a centrifugal casting method, and so on may be mentioned. If needed, a homogenization treatment (solution treatment) may be carried out to the obtained raw material alloy, when solidification segregation is found.

[Pulverization Step]

After the raw material alloy is produced, the raw material alloy is pulverized (pulverization step). The pulverization step may be carried out in a two-step process which includes a coarse pulverization step of pulverizing the alloy to a particle size of about several hundred μm to several mm; and a fine pulverization step of finely pulverizing to a particle size of about several μm. However, a single-step process consisting solely of a fine pulverization step may be carried out.

(Coarse Pulverization Step)

During the coarse pulverization step, the raw material alloy is coarsely pulverized till the particle size becomes approximately several hundred μm to several mm (coarse pulverization step). Thereby, a coarsely pulverized powder of the raw material alloy is obtained. For example, coarse pulverization can be done by first storing hydrogen into the raw material alloy, then dehydrogenating by releasing hydrogen based on the differences of hydrogen stored amount in different phases which causes self-collapsing pulverization (hydrogen storage pulverization). Conditions of the dehydrogenation is not particularly limited, for example, it may be carried out at a temperature within a range of 300 to 650° C. under Ar flow or in vacuum.

The coarse pulverization method is not limited to the above-mentioned hydrogen storage pulverization. For example, coarse pulverization may be carried out using a coarse pulverizer such as a stamp mill, a jaw crusher, a brown mill, and so on under inert gas atmosphere.

In order to obtain the R-T-B based sintered magnet having high magnetic properties, an atmosphere of each step from the pulverization step to the sintering step may be a low oxygen concentration atmosphere. The oxygen concentration is adjusted by controlling atmosphere at each step of the production. If the oxygen concentration at each step of the production is high, the rare earth element in the alloy powder obtained by pulverizing the raw material alloy is oxidized and R oxide is generated. The R oxide is not reduced after the sintering step; hence it is deposited in the grain boundary as R oxide. As a result, coercivity HcJ of the obtained R-T-B based sintered magnet tends to decrease easily. Thus, for example, each step (fine pulverization step, pressing step) may be carried out under the atmosphere having oxygen concentration of 100 ppm or less.

(Fine Pulverization Step)

After coarsely pulverizing the raw material alloy, the obtained coarsely pulverized powder is finely pulverized till the average particle size becomes several lam or so (fine pulverization step). Thereby, a finely pulverized powder of raw material alloy can be obtained. D50 of the particles included in the finely pulverized powder is not particularly limited. For example, D50 may be within a range of 1.0 μm or larger and 10.0 μm or smaller.

The fine pulverization is carried out by adjusting conditions of fine pulverization such as pulverization time and so on, and by further pulverizing the powder obtained by coarse pulverization using a fine pulverizer such as a jet mill or so. Below explains a jet mill. A jet mill is a fine pulverizer in which a high-pressure inert gas (for example, He gas, $N_2$ gas, and Ar gas) is released from a narrow nozzle to generate a high-speed gas flow, and this high-speed gas flow accelerates the coarsely pulverized powder of a raw material alloy to collide against each other or collide with a target or a container wall.

When the coarsely pulverized powder of the raw material alloy is finely pulverized, for example, a lubricant such as an organic lubricant or a solid lubricant may be added. As the organic lubricant, oleic amide, lauramide, zinc stearate, and the like may be mentioned. As the solid lubricant, for example, graphite and the like may be mentioned. By adding the lubricant, a finely pulverized powder can be obtained which tends to be easily oriented when magnetic field is applied during the pressing step. Either one of the organic lubricant or the solid lubricant may be used, or both of them may be mixed and used.

[Pressing Step]

The finely pulverized powder is pressed into a desired shape (pressing step). The pressing step is carried out by placing the finely pulverized powder in a mold arranged in magnetic field, and then applying a pressure, thereby the finely pulverized powder is pressed and a green compact is obtained. At this time, by carrying out pressing while applying a magnetic field, the finely pulverized powder can be pressed while orienting a crystal axis of the finely pulverized powder in a specific direction. Since the obtained green compact is oriented in a specific direction, the R-T-B based sintered magnet having even stronger magnetic anisotropy is obtained. While carrying out pressing, a pressing aid may be added. A type of the pressing aid is not particularly limited. The above-mentioned lubricant may be used.

During pressure application, for example, pressure within a range of 30 MPa or more and 300 MPa or less may be applied. For example, as applied magnetic field, magnetic field within a range of 1.0 T or larger and 5.0 T or smaller may be applied. The applied magnetic field is not limited to static magnetic field, and it may also be pulse magnetic field. Also, static magnetic field and pulse magnetic field may be used together.

Note that, as a pressing method, a dry pressing method which directly presses the finely pulverized powder as mentioned in above, or a wet pressing method which presses a slurry having the finely pulverized powder dispersed in a solvent such as oil and so on may be used.

A shape of the green compact obtained by pressing the finely, pulverized powder is not particularly limited, and it can be a shape matching a desired shape of the R-T-B based sintered magnet such as a rectangular parallelepiped shape, a flat plate shape, a columnar shape, a ring shape, a C-like shape, and so on.

[Sintering Step]

The obtained green compact is sintered in vacuum or in inert gas atmosphere to obtain the R-T-B based sintered magnet (sintering step). A sintering temperature needs to be regulated depending on various conditions such as a composition, a pulverization method, an average of the particle sizes and particle size distribution, and so on. A sintering temperature is not particularly limited, and for example, it may be within a range of 950° C. or higher and 1100° C. or lower. A sintering time is not particularly limited, and it may be within a range of 2 hours or longer and 10 hours or shorter. A sintering atmosphere is not particularly limited. For example, it may be inert gas atmosphere, or may be in vacuum atmosphere of less than 100 Pa.

The higher the sintering temperature is, the easier it is for sintering to proceed sufficiently, and also HcJ and Br tend to improve easier. However, the higher the sintering temperature is, the easier it is for abnormal grain growth to occur. When the abnormal grain growth occurs, Hk/HcJ tends to decrease easier. The lower the sintering temperature is, the harder it is to proceed sintering, and it becomes difficult to improve Br and HcJ. However, the lower the sintering temperature is, the less unlikely it is for the abnormal grain growth to occur, and it tends to become harder to decrease Hk/HcJ.

[Aging Treatment Step]

After sintering the green compact, aging treatment is performed to the R-T-B based sintered magnet (aging treatment step). After sintering, the aging treatment is performed to the obtained. R-T-B based sintered magnet at a temperature lower than a temperature during the sintering step.

Conditions of aging treatment may be, an aging temperature within a range of 400° C. or higher and 650° C. or lower, and an aging time within a range of 10 minutes or longer and 300 minutes or shorter.

Atmosphere while carrying out the aging treatment is not particularly limited. For example, the atmosphere may be inert gas atmosphere such as He gas, Ar gas) with pressure higher than atmospheric pressure. Also, the aging treatment step may be carried out after the machining step described in below.

[Machining Step]

The obtained R-T-B based sintered magnet may be machined into a desired shape if needed (machining step). A machining method may, for example, be shape processing such as cutting and grinding, and chamfering such as barrel polishing.

[Grain Boundary Diffusion Step]

Heavy rare earth elements may be further diffused to the grain boundary of the machined R-T-B based sintered magnet (grain boundary diffusion step). A method of grain boundary diffusion is not particularly limited. For example, a compound including the heavy rare earth elements may be adhered on a surface of the R-T-B sintered magnet by coating, deposition, and the like, and then the heat treatment may be carried out, thereby the grain boundary diffusion may be performed. Also, the R-T-B based sintered magnet may be heat treated under the atmosphere including vapor of heavy rare earth elements. By carrying out the grain boundary diffusion, of the R-T-B based sintered magnet can be further improved.

[Surface Treatment Step]

The R-T-B based sintered magnet obtained by going through the above-mentioned steps may be further subjected to a surface treatment such as plating, resin coating, an oxidizing treatment, and a chemical treatment, and so on (surface treatment step). Thereby, corrosion resistance can be further improved.

Note that, in the above-mentioned production method, the machining step, the grain boundary diffusion step, and the surface treatment step are performed, however, these steps do not necessarily have to be carried out.

The R-T-B based sintered magnet obtained as described in above becomes an R-T-B based sintered magnet having good Br, HcJ, Hk/HcJ, and corrosion resistance while including Ce.

The present disclosure is not limited to the above-mentioned embodiment, and various modifications may be applied within a scope of the present disclosure. For example, the permanent magnet according to the present disclosure may be produced using a hot working method.

The R-T-B based permanent magnet according to the present disclosure can be used as a general R-T-B based permanent magnet. For example, it can be used a rotating machine for automobile and so on.

EXAMPLES

Hereinbelow, the present disclosure is described in detail using examples, however, the present disclosure is not limited thereto.

(Alloy Preparation Step)

As raw material alloys, raw material metals including predetermined elements were prepared. As the raw material metals, Nd, Pr, Ce, Fe, Co, FeB, Al, Cu Zr, and Ga each having purity of 99.9% were prepared.

Next, these raw material metals were weighed so as to obtain the compositions of the R-T-B based sintered magnets shown in Table 1 to Table 8, then thin plate shape raw material alloys were prepared using a strip casting method. Note that, other than Ce in Table 1 to Table 8 were Nd and Pr, and a mass ratio was Nd:Pr=8:2. Also, the substantial balance was Fe.

(Pulverization Step)

The raw material alloy obtained after the alloy preparation step was pulverized, and an alloy powder was obtained. The raw material alloy was pulverized in two steps of a coarse pulverization and a fine pulverization. The coarse pulverization was carried out using hydrogen storage pulverization. After storing hydrogen in the raw material alloy, dehydrogenation was carried out while flowing Ar or in vacuum at 600° C. for 3 hours. By carrying out coarse pulverization, an alloy powder having particle sizes within a range of several hundred μm to several mm was obtained.

The fine pulverization was carried out under high pressure nitrogen gas atmosphere by adding 0.1 parts by mass of oleic amide as a lubricant to 100 parts by weight of the alloy powder obtained by coarse pulverization, then these were mixed using a jet mill to obtain a mixed powder. Fine pulverization was carried out until D50 of the alloy powder was about 3.5 μm or so.

(Pressing Step)

The obtained mixed powder after the pulverization step was pressed in magnetic field to obtain a green compact. After the mixed powder is placed in a mold arranged in electromagnets, pressing was carried out by applying pressure while also applying magnetic field using electromagnets. Specifically, the mixed powder was pressed by applying pressure of 110 MPa in magnetic field of 2.2 T. A direction of the magnetic field application was perpendicular to a direction of pressure application.

(Sintering Step)

The obtained green compact was sintered to obtain a sintered body. Unless mentioned otherwise, a sintering temperature was 1000° C. and a sintering time was 8 hours, thereby the sintered body was obtained. Sintering was carried out in vacuumed atmosphere.

A sintering temperature of Example 28a was 980° C., and a sintering temperature of each of Example 28b and Example 28c was 990° C.

(Aging Treatment Step)

An aging treatment was carried out to the obtained sintered body to obtain an R-T-B based sintered magnet. For the aging treatment, an aging treatment temperature was at 600° C., and an aging treatment time was 1 hour. Atmosphere during the aging treatment was Ar atmosphere.

(Evaluation)

Compositional analysis was carried out using a fluorescence X-ray analysis, an inductively coupled plasma emission spectroscopic analysis (ICP analysis), and a gas analysis to verify that the composition of the obtained R-T-B based sintered magnet at the end of each example and each comparative example had the same composition as shown in Table 1 to Table 9.

The magnetic properties of the R-T-B based sintered magnet from each example and each comparative example were measured using a BH tracer. Specifically, Br, HcJ, and Hk/HcJ were measured at room temperature. Results are shown in Table 1 to Table 9. Br of 1220 mT or higher was considered good. HcJ higher than 1445 kA/m was considered good, and 1450 kA/m or higher was considered even better. For Hk/HcJ, it was evaluated whether Hk/HcJ was 95% or higher. In Table 1 to Table 9, Hk/HcJ of 95% or higher was evaluated as pass, and less than 95% was evaluated as fail.

A corrosion resistance test was carried out to the R-T-B based sintered magnet of each example and comparative example. The corrosion resistance test was carried out using a PCT test (Pressure Cooker Test) under saturated vapor atmosphere. Specifically, the R-T-B based sintered magnet was left under the environment of 2 atmospheric pressure and 100% RH for 1000 hours to measure a change in mass before and after the test. The evaluation was carried out to verify whether a mass decrease per surface area of the R-T-B based sintered magnet was 3 $mg/cm^2$ or less. In Table 1 to Table 9, 3 $mg/cm^2$ or less was indicated as pass, and larger than 3 $mg/cm^2$ was indicated as fail.

TABLE 1

| | Ce/TRE | unit: mass % | | | | | | | Br | HcJ | | Corrosion |
|---|---|---|---|---|---|---|---|---|---|---|---|---|
| | (mass %) | TRE | B | Co | Cu | Al | Ga | Zr | mT | kA/m | Hk/HcJ | resistance |
| Example 2 | 16 | 33.0 | 0.83 | 2.00 | 0.05 | 0.50 | 0.00 | 0.50 | 1261 | 1564 | Pass | Pass |
| Example 3 | 18 | 33.0 | 0.83 | 2.00 | 0.05 | 0.50 | 0.00 | 0.50 | 1257 | 1545 | Pass | Pass |
| Example 1 | 20 | 33.0 | 0.83 | 2.00 | 0.05 | 0.50 | 0.00 | 0.50 | 1256 | 1522 | Pass | Pass |
| Example 4 | 22 | 33.0 | 0.83 | 2.00 | 0.05 | 0.50 | 0.00 | 0.50 | 1253 | 1506 | Pass | Pass |
| Example 5 | 24 | 33.0 | 0.83 | 2.00 | 0.05 | 0.50 | 0.00 | 0.50 | 1250 | 1475 | Pass | Pass |
| Comparative example 1 | ***26*** | 33.0 | 0.83 | 2.00 | 0.05 | 0.50 | 0.00 | 0.50 | 1245 | ***1445*** | Pass | Pass |

TABLE 2

| | Ce/TRE | unit: mass % | | | | | | | Br | HoJ | | Corrosion |
|---|---|---|---|---|---|---|---|---|---|---|---|---|
| | (mass %) | TRE | B | Co | Cu | Al | Ga | Zr | mT | kA/m | Hk/HcJ | resistance |
| Example 6 | 20 | 32.0 | 0.83 | 2.00 | 0.05 | 0.50 | 0.00 | 0.50 | 1271 | 1460 | Pass | Pass |
| Example 7 | 20 | 32.5 | 0.83 | 2.00 | 0.05 | 0.50 | 0.00 | 0.50 | 1263 | 1497 | Pass | Pass |
| Example 1 | 20 | 33.0 | 0.83 | 2.00 | 0.05 | 0.50 | 0.00 | 0.50 | 1256 | 1522 | Pass | Pass |
| Example 8 | 20 | 33.5 | 0.83 | 2.00 | 0.05 | 0.50 | 0.00 | 0.50 | 1250 | 1550 | Pass | Pass |
| Example 9 | 20 | 34.0 | 0.83 | 2.00 | 0.05 | 0.50 | 0.00 | 0.50 | 1234 | 1577 | Pass | Pass |
| Comparative example 3 | 20 | ***34.5*** | 0.83 | 2.00 | 0.05 | 0.50 | 0.00 | 0.50 | ***1219*** | 1589 | Pass | Pass |

TABLE 3

| | Ce/TRE | unit: mass % | | | | | | | Br | HcJ | | Corrosion |
|---|---|---|---|---|---|---|---|---|---|---|---|---|
| | (mass %) | TRE | B | Co | Cu | Al | Ga | Zr | mT | kA/m | Hk/HcJ | resistance |
| Comparative example 4 | 20 | 33.0 | ***0.77*** | 2.00 | 0.05 | 0.50 | 0.00 | 0.50 | 1234 | 1520 | ***Fail*** | Pass |
| Example 10 | 20 | 33.0 | 0.80 | 2.00 | 0.05 | 0.50 | 0.00 | 0.50 | 1255 | 1522 | Pass | Pass |
| Example 1 | 20 | 33.0 | 0.83 | 2.00 | 0.05 | 0.50 | 0.00 | 0.50 | 1256 | 522 | Pass | Pass |
| Example 11 | 20 | 33.0 | 0.86 | 2.00 | 0.05 | 0.50 | 0.00 | 0.50 | 1257 | 1510 | Pass | Pass |
| Example 12 | 20 | 33.0 | 0.89 | 2.00 | 0.05 | 0.50 | 0.00 | 0.50 | 1260 | 1499 | Pass | Pass |
| Comparative example 5 | 20 | 33.0 | ***0.92*** | 2.00 | 0.05 | 0.50 | 0.00 | 0.50 | 1275 | ***1432*** | Pass | Pass |

TABLE 4

| | Ce/TRE | unit: mass % | | | | | | | Br | HcJ | | Corrosion |
|---|---|---|---|---|---|---|---|---|---|---|---|---|
| | (mass %) | TRE | B | Co | Cu | Al | Ga | Zr | mT | KA/m | Hk/HcJ | resistance |
| Example 13 | 20 | 33.0 | 0.83 | 2.00 | 0.00 | 0.50 | 0.00 | 0.50 | 1257 | 1515 | Pass | Pass |
| Example 1 | 20 | 33.0 | 0.83 | 2.00 | 0.05 | 0.50 | 0.00 | 0.50 | 1256 | 1522 | Pass | Pass |
| Example 14 | 20 | 33.0 | 0.83 | 2.00 | 0.10 | 0.50 | 0.00 | 0.50 | 1255 | 1505 | Pass | Pass |
| Example 15 | 20 | 33.0 | 0.83 | 2.00 | 0.15 | 0.50 | 0.00 | 0.50 | 1255 | 1491 | Pass | Pass |
| Example 16 | 20 | 33.0 | 0.83 | 2.00 | 0.20 | 0.50 | 0.00 | 0.50 | 1255 | 1475 | Pass | Pass |
| Example 17 | 20 | 33.0 | 0.83 | 2.00 | 0.25 | 0.50 | 0.00 | 0.50 | 1253 | 1457 | Pass | Pass |
| Comparative example 6 | 20 | 33.0 | 0.83 | 2.00 | ***0.30*** | 0.50 | 0.00 | 0.50 | 1251 | ***1445*** | Pass | Pass |

TABLE 5

| | Ce/TRE | unit: mass % | | | | | | | Br | HcJ | | Corrosion |
|---|---|---|---|---|---|---|---|---|---|---|---|---|
| | (mass %) | TRE | B | Co | Cu | Al | Ga | Zr | ml | kA/m | Hk/HcJ | resistance |
| Example 18a | 20 | 34.0 | 0.83 | 2.00 | 0.05 | 0.03 | 0.00 | 0.50 | 1262 | 1473 | Pass | Pass |
| Example 18b | 20 | 33.0 | 0.83 | 2.00 | 0.05 | 0.10 | 0.00 | 0.50 | 1290 | 1448 | Pass | Pass |
| Example 18 | 20 | 33.0 | 0.83 | 2.00 | 0.05 | 0.30 | 0.00 | 0.50 | 1275 | 1491 | Pass | Pass |
| Example 1 | 20 | 33.0 | 0.83 | 2.00 | 0.05 | 0.50 | 0.00 | 0.50 | 1256 | 1522 | Pass | Pass |
| Example 19 | 20 | 33.0 | 0.83 | 2.00 | 0.05 | 0.70 | 0.00 | 0.50 | 1239 | 1532 | Pass | Pass |
| Example 20 | 20 | 33.0 | 0.83 | 2.00 | 0.05 | 0.90 | 0.00 | 0.50 | 1221 | 1533 | Pass | Pass |
| Comparative example 8 | 20 | 33.0 | 0.83 | 2.00 | 0.05 | ***1.10*** | 0.00 | 0.50 | ***1203*** | 1530 | Pass | Pass |

TABLE 6

| | Ce/TRE | unit: mass % | | | | | | | Br | HcJ | | Corrosion |
|---|---|---|---|---|---|---|---|---|---|---|---|---|
| | (mass %) | TRE | B | Co | Cu | A | Ga | Zr | mT | kA/m | Hk/HcJ | resistance |
| Example 1 | 20 | 33.0 | 0.83 | 2.00 | 0.05 | 0.50 | 0.00 | 0.50 | 1256 | 1522 | Pass | Pass |
| Example 21 | 20 | 33.0 | 0.83 | 2.00 | 0.05 | 0.50 | 0.05 | 0.50 | 1254 | 1499 | Pass | Pass |
| Example 22 | 20 | 33.0 | 0.83 | 2.00 | 0.05 | 0.50 | 0.10 | 0.50 | 1250 | 1477 | Pass | Pass |
| Comparative example 9 | 20 | 33.0 | 0.83 | 2.00 | 0.05 | 0.50 | ***0.15*** | 0.50 | 1246 | ***1443*** | Pass | Pass |

TABLE 7

| | Ce/TRE | unit: mass % | | | | | | | Br | HcJ | | Corrosion |
|---|---|---|---|---|---|---|---|---|---|---|---|---|
| | (mass %) | TRE | B | Co | Cu | A | Ga | Zr | mT | kA/m | Hk/HcJ | resistance |
| Comparative example 10 | 20 | 33.0 | 0.83 | ***1.60*** | 0.05 | 0.50 | 0.00 | 0.50 | 1254 | 1535 | Pass | Fail |
| Example 23 | 20 | 33.0 | 0.83 | 1.85 | 0.05 | 0.50 | 0.00 | 0.50 | 1254 | 1531 | Pass | Pass |
| Example 24 | 20 | 33.0 | 0.83 | 1.91 | 0.05 | 0.50 | 0.00 | 0.50 | 1255 | 1527 | Pass | Pass |
| Example 1 | 20 | 33.0 | 0.83 | 2.00 | 0.05 | 0.50 | 0.00 | 0.50 | 1256 | 1522 | Pass | Pass |
| Example 25 | 20 | 33.0 | 0.83 | 2.09 | 0.05 | 0.50 | 0.00 | 0.50 | 1257 | 1505 | Pass | Pass |
| Example 26 | 20 | 33.0 | 0.83 | 2.40 | 0.05 | 0.50 | 0.00 | 0.50 | 1259 | 1485 | Pass | Pass |
| Example 27 | 20 | 33.0 | 0.83 | 2.80 | 0.05 | 0.50 | 0.00 | 0.50 | 1264 | 1453 | Pass | Pass |
| Comparative example 11 | 20 | 33.0 | 0.83 | ***3.20*** | 0.05 | 0.50 | 0.00 | 0.50 | 1270 | ***1412*** | Pass | Pass |

TABLE 8

| | Ce/TRE | unit: mass % | | | | | | | Br | HcJ | | Corrosion |
|---|---|---|---|---|---|---|---|---|---|---|---|---|
| | (mass %) | TRE | B | Co | Cu | A | Ga | Zr | mT | kA/m | Hk/HcJ | resistance |
| Example 28a | 20 | 33.0 | 0.83 | 2.00 | 0.05 | 0.50 | 0.00 | 0.00 | 1244 | 1500 | Pass | Pass |
| Example 28b | 20 | 33.0 | 0.83 | 2.00 | 0.05 | 0.50 | 0.00 | 0.10 | 1250 | 1515 | Pass | Pass |
| Example 28c | 20 | 33.0 | 0.83 | 2.00 | 0.05 | 0.50 | 0.00 | 0.30 | 1254 | 1520 | Pass | Pass |
| Example 28 | 20 | 33.0 | 0.83 | 2.00 | 0.05 | 0.50 | 0.00 | 0.40 | 1255 | 1524 | Pass | Pass |
| Example 1 | 20 | 33.0 | 0.83 | 2.00 | 0.05 | 0.50 | 0.00 | 0.50 | 1256 | 1522 | Pass | Pass |
| Example 29 | 20 | 33.0 | 0.83 | 2.00 | 0.05 | 0.50 | 0.00 | 0.60 | 1253 | 1522 | Pass | Pass |
| Comparative example 13 | 20 | 33.0 | 0.83 | 2.00 | 0.05 | 0.50 | 0.00 | ***0.70*** | 1253 | 1523 | ***Fail*** | Pass |
| Reference example 1 | 20 | 33.0 | 0.83 | 2.00 | 0.05 | 0.50 | 0.00 | 0.30 | 1256 | 1523 | ***Fail*** | Pass |

TABLE 9

| | Ce/TRE | unit: mass % | | | | | | | Br | HcJ | | Corrosion |
|---|---|---|---|---|---|---|---|---|---|---|---|---|
| | (mass %) | TRE | B | Co | Cu | Al | Ga | Zr | mT | kA/m | Hk/HcJ | resistance |
| Comparative example 14 | 16 | ***31.0*** | 0.83 | 2.00 | 0.05 | 0.70 | 0.00 | 0.50 | 1273 | ***1420*** | Pass | Pass |
| Example 30 | 16 | 31.3 | 0.83 | 2.00 | 0.05 | 0.70 | 0.00 | 0.50 | 1267 | 1451 | Pass | Pass |
| Example 31 | 16 | 31.5 | 0.83 | 2.00 | 0.05 | 0.70 | 0.00 | 0.50 | 1262 | 1465 | Pass | Pass |

According to Table 1 to Table 9, each example in which the composition satisfied the above-mentioned ranges had good Br, HcJ, Hk/HcJ, and corrosion resistance. On the contrary, regarding each comparative example, of which the composition did not satisfy the above-mentioned ranges, one or more of Br, HcJ, Hk/HcJ, and corrosion resistance was not good.

Particularly, Comparative example 4 shown in Table 3, of which the amount of B was too small, exhibited a lowered Hk/HcJ since a different phase, particularly a 2-17 phase, was formed. Comparative example 10 shown in Table 7, of which the amount of Co was too small, exhibited a lowered corrosion resistance. Comparative example 8, of which the amount of Zr was too large, had lowered Hk/HcJ since a different phase, particularly a 2-17 phase, was formed.

Example 28c and Reference example 1 shown in Table 8 were experiment examples of which sintered bodies were produced under the same conditions except for the sintering temperatures.

Example 28c had smaller amount of Zr and had lower sintering temperature compared to Example 28 and so on. In Example 28c, since the sintering temperature was adjusted suitably according to the composition, abnormal grain growth did not occur and a good Hk/HcJ was obtained.

On the contrary, Reference example 1 had a smaller amount of Zr but the sintering temperature was not lowered compared to Example 28 and so on. In Reference example 1, since the sintering temperature was not suitably, adjusted according to the composition, abnormal grain growth occurred and Hk/HcJ was lowered.

Figure 2:
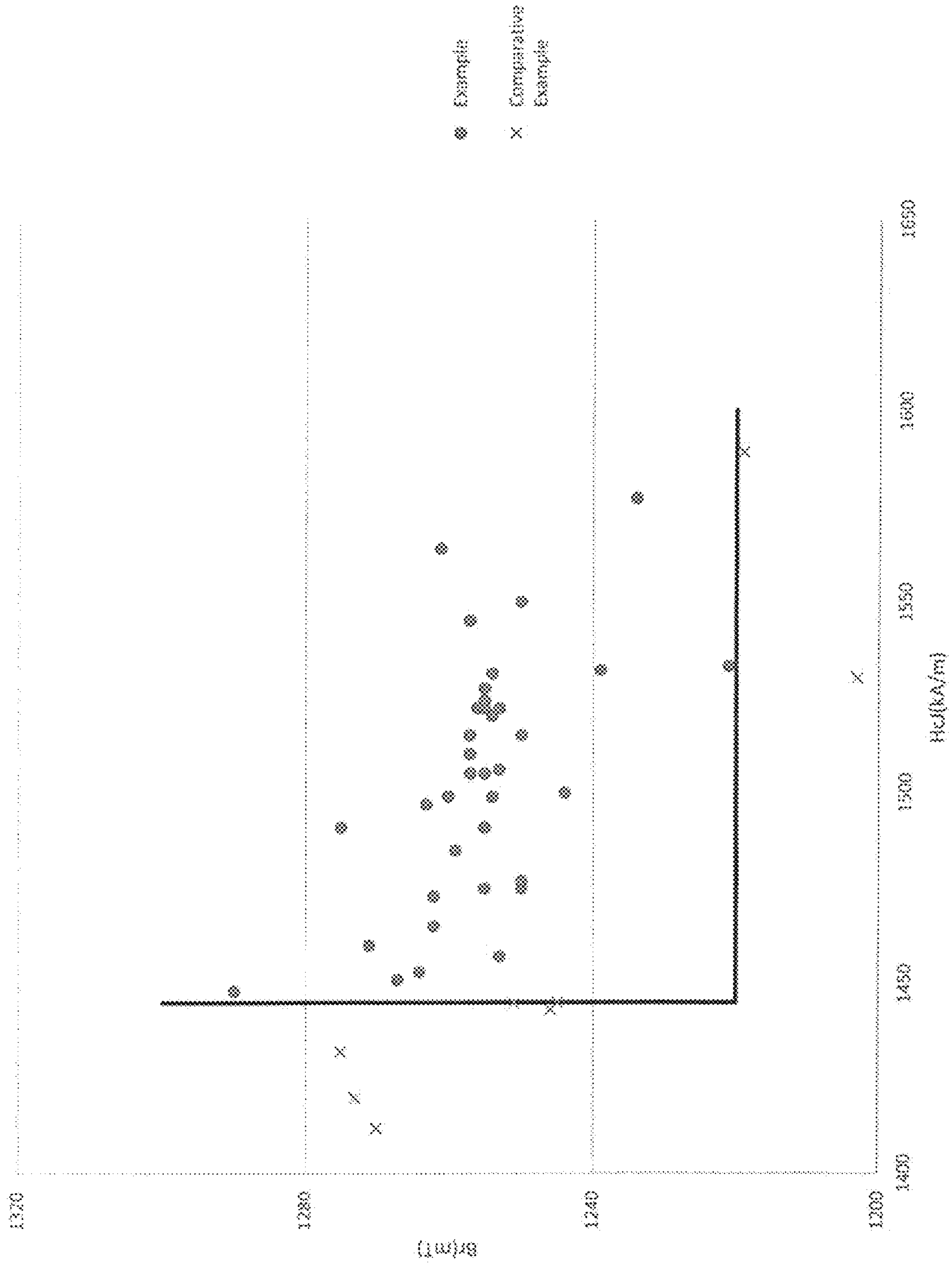
FIG. 2 is a graph to which magnetic properties of each example are platted.

In the graph of FIG. 2, all of examples and all of comparative examples which did not have good Br or Ha are plotted, and a horizontal axis is HcJ and a vertical axis is Br. It can be understood also from FIG. 2 that in order to achieve Br of 1220 mT or larger, HcJ of 1445 kA/m or larger, and good properties in addition to the other properties, it is necessary that the magnet composition satisfies specific ranges.

Also, for all examples, microstructures were verified, and it was confirmed that the main phase grain including an $R_2T_{14}B$ compound and a grain boundary were included, an R-T phase was included in the grain boundary, and also confirmed that the amount of Ce to R in the R-T phase was larger than in the main phase grain,

REFERENCE SIGNS LIST

1 . . . R-T-B based sintered magnet
11 . . . Main phase grain
13 . . . R-T phase
15 . . . R-rich phase

What is claimed is:

1. An R-T-B based permanent magnet comprising R, T, B, Al, and Zr; wherein
- R is a rare earth element and at least includes Ce,
- a total amount of R is within a range of 31.3 mass % or more and 34.0 mass % or less,
- T is Fe and Co,
- an amount of Co is within a range of 1.85 mass % or more and 2.80 mass % or less,
- an amount of B is within a range of 0.80 mass % or more and 0.90 mass % or less,
- an amount of Al is within a range of 0.03 mass % or more and 0.90 mass % or less,
- an amount of Cu is within a range of 0 mass % or more and 0.25 mass % or less,
- an amount of Ga is within a range of 0 mass % or more and 0.10 mass % or less,
- an amount of Zr is within a range of 0.10 mass % or more and 0.60 mass % or less,
- an amount of Fe is a substantial balance, and
- an amount of Ce to the total amount of R is within a range of 0.15 or more and 0.25 or less.

2. The R-T-B based sintered magnet according to claim 1 comprising a main phase grain including an $R_2T_{14}B$ compound, and a grain boundary, wherein the grain boundary includes an R-T phase.

3. The R-T-B based permanent according to claim 2, wherein an amount of Ce of the R-T phase to a total amount of R of the R-T phase is larger than an amount of Ce of the main phase grain to a total amount of R of the main phase grain.

4. The R-T-B based permanent magnet according to claim 1, wherein a total amount of heavy rare earth elements is within a range of 0 mass % or more and 0.10 mass % or less.

5. The R-T-B based sintered magnet according to claim 1, wherein the amount of Co is within a range of 1.85 mass % or more and 2.09 mass % or less.

6. The R-T-B based sintered magnet according to claim 1, wherein R includes one or more selected from Nd and Pr.

7. The R-T-B based sintered magnet according to claim 1, wherein the total amount of R is within a range of 32.0 mass % or more and 34.0 mass % or less.

8. The R-T-B based sintered magnet according to claim 1, wherein the amount of B is within a range of 0.80 mass % or more and 0.89 mass % or less.

9. The R-T-B based sintered magnet according to claim 1, wherein the amount of B is within a range of 0.80 mass % or more and 0.86 mass % or less.

10. The R-T-B based sintered magnet according to claim 1, wherein the amount of Co is within a range of 1.91 mass % or more and 2.09 mass % or less.

11. The R-T-B based sintered magnet according to claim 1, wherein the amount of Al is within a range of 0.30 mass % or more and 0.90 mass % or less.

12. The R-T-B based sintered magnet according to claim 1, wherein the amount of Cu is within a range of 0.02 mass % or more and 0.08 mass % or less.

13. The R-T-B based sintered magnet according to claim 1, wherein an amount of Zr is within a range of 0.40 mass % or more and 0.60 mass % or less.

14. The R-T-B based sintered magnet according to claim 1, wherein the amount of Ce to the total amount of R is within a range of 0.16 or more and 0.24 or less.

15. The R-T-B based sintered magnet according to claim 1, wherein an amount of Y to the total amount of R and an amount of La to the total amount of R are 0.005 or less in total.

16. The R-T-B based sintered magnet according to claim 1, wherein elements other than the group consisting of R, B, Fe, Co, Ga, Al, Cu, and Zr are inevitable impurities, and an amount of inevitable impurities is 0 or more and 0.5 mass % or less in total with respect to the R-T-B based sintered magnet.

* * * * *